(12) United States Patent
Hemani et al.

(10) Patent No.: US 11,367,271 B2
(45) Date of Patent: Jun. 21, 2022

(54) SIMILARITY PROPAGATION FOR ONE-SHOT AND FEW-SHOT IMAGE SEGMENTATION

(71) Applicant: ADOBE INC., San Jose, CA (US)

(72) Inventors: Mayur Hemani, Noida (IN); Siddhartha Gairola, Uttarakhand (IN); Ayush Chopra, Delhi (IN); Balaji Krishnamurthy, Noida (IN); Jonas Dahl, Basel (CH)

(73) Assignee: Adobe Inc., San Jose, CA (US)

( * ) Notice: Subject to any disclaimer, the term of this patent is extended or adjusted under 35 U.S.C. 154(b) by 158 days.

(21) Appl. No.: 16/906,954

(22) Filed: Jun. 19, 2020

(65) Prior Publication Data

US 2021/0397876 A1    Dec. 23, 2021

(51) Int. Cl.
*G06K 9/62* (2022.01)
*G06V 10/46* (2022.01)
*G06K 9/46* (2006.01)

(52) U.S. Cl.
CPC ........... *G06V 10/462* (2022.01); *G06K 9/629* (2013.01); *G06K 9/6265* (2013.01)

(58) Field of Classification Search
CPC ...... G06N 3/0454; G06N 3/08; G06N 3/0445; G06K 2209/21; G06K 9/2054
See application file for complete search history.

(56) References Cited

U.S. PATENT DOCUMENTS

| | | | |
|---|---|---|---|
| 6,377,309 B1 * | 4/2002 | Ito | H04N 21/4347 375/E7.076 |
| 7,099,394 B2 * | 8/2006 | Kohno | G06V 10/7515 375/240.27 |
| 7,680,314 B2 * | 3/2010 | Hong | G06T 7/143 382/173 |
| 8,068,545 B2 * | 11/2011 | Penna | H04N 19/423 375/240.25 |

(Continued)

OTHER PUBLICATIONS

Gairola, S., Hemani, M., Chopra, A., & Krishnamurthy, B. (2020). SimPropNet: Improved Similarity Propagation for Few-shot Image Segmentation. arXiv preprint arXiv:2004.15014.

(Continued)

*Primary Examiner* — Yosef Kassa
(74) *Attorney, Agent, or Firm* — Shook, Hardy & Bacon L.L.P.

(57) ABSTRACT

Embodiments of the present invention provide systems, methods, and computer storage media for one-shot and few-shot image segmentation on classes of objects that were not represented during training. In some embodiments, a dual prediction scheme may be applied in which query and support masks are jointly predicted using a shared decoder, which aids in similarity propagation between the query and support features. Additionally or alternatively, foreground and background attentive fusion may be applied to utilize cues from foreground and background feature similarities between the query and support images. Finally, to prevent overfitting on class-conditional similarities across training classes, input channel averaging may be applied for the (Continued)

query image during training. Accordingly, the techniques described herein may be used to achieve state-of-the-art performance for both one-shot and few-shot segmentation tasks.

20 Claims, 7 Drawing Sheets

(56) References Cited

U.S. PATENT DOCUMENTS

| | | | | |
|---|---|---|---|---|
| 8,081,871 B2* | 12/2011 | Takakuwa | ............ | G11B 27/034 386/341 |
| 8,681,870 B2* | 3/2014 | Takada | ............ | H04N 19/14 375/240.24 |
| 8,985,140 B2* | 3/2015 | Pettinaroli | ............ | G05D 7/0113 137/487 |

OTHER PUBLICATIONS

Aksoy, Y., Oh, T. H., Paris, S., Pollefeys, M., & Matusik, W. (2018). Semantic soft segmentation. ACM Transactions on Graphics (TOG), 37(4), 1-13.
Badrinarayanan, V., Kendall, A., & Cipolla, R. (2017). Segnet: A deep convolutional encoder-decoder architecture for image segmentation. IEEE transactions on pattern analysis and machine intelligence, 39(12), 2481-2495.
Chen, L. C., Papandreou, G., Kokkinos, I., Murphy, K., & Yuille, A. L. (2014). Semantic image segmentation with deep convolutional nets and fully connected crfs. arXiv preprint arXiv:1412.7062. 14 pages.
Chen, L. C., Papandreou, G., Kokkinos, I., Murphy, K., & Yuille, A. L. (2017). Deeplab: Semantic image segmentation with deep convolutional nets, atrous convolution, and fully connected crfs. arXiv preprint arXiv:160600915v2. 14 pages.
Chen, L. C., Papandreou, G., Schroff, F., & Adam, H. (2017). Rethinking atrous convolution for semantic image segmentation. arXiv preprint arXiv:1706.05587.
Chen, L. C., Zhu, Y., Papandreou, G., Schroff, F., & Adam, H. (2018). Encoder-decoder with atrous separable convolution for semantic image segmentation. In Proceedings of the European conference on computer vision (ECCV) (pp. 801-818).
Cordts, M., Omran, M., Ramos, S., Rehfeld, T., Enzweiler, M., Benenson, R., . . . & Schiele, B. (2016). The cityscapes dataset for semantic urban scene understanding. In Proceedings of the IEEE conference on computer vision and pattern recognition (pp. 3213-3223).
Dolz, J., Ayed, I. B., Yuan, J., & Desrosiers, C. (2017). HyperDense-Net: A hyper-densely connected CNN for multimodal image semantic segmentation. arXiv preprint arXiv:1710.05956.
Dong, N., & Xing, E. P. (Sep. 2018). Few-Shot Semantic Segmentation with Prototype Learning. In BMVC (vol. 3, No. 4).
Everingham, M., & Winn, J. (2011). The pascal visual object classes challenge 2012 (voc2012) development kit. Pattern Analysis, Statistical Modelling and Computational Learning, Tech. Rep, 8.
He, K., Zhang, X., Ren, S., & Sun, J. (2016). Deep residual learning for image recognition. In Proceedings of the IEEE conference on computer vision and pattern recognition (pp. 770-778).
Nguyen, K., & Todorovic, S. (2019). Feature weighting and boosting for few-shot segmentation. In Proceedings of the IEEE International Conference on Computer Vision (pp. 622-631).
Rakelly, K., Shelhamer, E., Darrell, T., Efros, A., & Levine, S. (2018). Conditional networks for few-shot semantic segmentation.
Ronneberger, O., Fischer, P., & Brox, T. (2015). U-Net: Convolutional Networks for Biomedical Image Segmentation. arXiv preprint arXiv: 1505.04597.
Russakovsky, O., Deng, J., Su, H., Krause, J., Satheesh, S., Ma, S., . . . & Berg, A. C. (2014). ImageNet Large Scale Visual Recognition Challenge. arXiv preprint arXiv:1409.0575.
Shaban, A., Bansal, S., Liu, Z., Essa, I., & Boots, B. (2017). One-shot learning for semantic segmentation. arXiv preprint arXiv:1709.03410.
Siam, M., Oreshkin, B., & Jagersand, M. (2019). Adaptive Masked Proxies for Few-Shot Segmentation. arXiv preprint arXiv:1902.11123.
Simonyan, K., & Zisserman, A. (2014). Very deep convolutional networks for large-scale image recognition. arXiv preprint arXiv:1409.1556.
Sinha, A., & Dolz, J. (2019). Multi-scale guided attention for medical image segmentation. arXiv preprint arXiv:1906.02849.
Snell, J., Swersky, K., & Zemel, R. (2017). Prototypical networks for few-shot learning. In Advances in neural Information processing systems (pp. 4077-4087).
Tai, Y. W., Jia, J., & Tang, C. K. (2007). Soft color segmentation and its applications. IEEE transactions on pattern analysis and machine intelligence, 29(9), 1520-1537.
Tan, J., Lien, J. M., & Gingold, Y. (2016). Decomposing images into layers via RGB-space geometry. ACM Transactions on Graphics (TOG), 36(1), 1-14.
Ulyanov, D., Vedaldi, A., & Lempitsky, V. (2016). Instance normalization: The missing ingredient for fast stylization. arXiv preprint arXiv:1607.08022.
Wang, J., Sun, K., Cheng, T., Jiang, B., Deng, C., Zhao, Y., . . . & Liu, W. (2020). Deep high-resolution representation learning for visual recognition IEEE transactions on pattern analysis and machine intelligence.
Wang, K., Liew, J. H., Zou, Y., Zhou, D., & Feng, J. (2019). Panet: Few-shot image semantic segmentation with prototype alignment. In Proceedings of the IEEE International Conference on Computer Vision (pp. 9197-9206).
Zhang, X., Wei, Y., Yang, Y., & Huang, T. S. (2020). Sg-one: Similarity guidance network for one-shot semantic segmentation. IEEE Transactions on Cybernetics.
Zhang, C., Lin, G., Liu, F., Guo, J., Wu, Q., & Yao, R. (2019). Pyramid graph networks with connection attentions for region-based one-shot semantic segmentation. In Proceedings of the IEEE International Conference on Computer Vision (pp. 9587-9595).
Zhang, C., Lin, G., Liu, F., Yao, R., & Shen, C. (2019). Canet: Class-agnostic segmentation networks with iterative refinement and attentive few-shot learning. In Proceedings of the IEEE Conference on Computer Vision and Pattern Recognition (pp. 5217-5226).
Zhao, H., Shi, J., Qi, X., Wang, X., & Jia, J. (2017). Pyramid scene parsing network. In Proceedings of the IEEE conference on computer vision and pattern recognition (pp. 2881-2890).

* cited by examiner

SIMILARITY PROPAGATION FOR ONE-SHOT AND FEW-SHOT IMAGE SEGMENTATION

BACKGROUND

Semantic image segmentation is a technique that assigns class labels to image pixels. Semantic image segmentation has a variety of applications, including image editing, medical diagnosis, and automated driving, to name a few examples. One type of semantic image segmentation is few-shot image segmentation, which generally predicts a segmentation mask identifying pixels in a query image that belong to a particular class, based on example images (support images) and corresponding segmentation masks (support masks) that identify pixels in the example images that belong to the same class. Whereas few-shot segmentation uses a few support image-mask pairs, one-shot segmentation uses only a single support image-mask pair.

SUMMARY

Embodiments of the present invention are directed to object detection, and more specifically, improved similarity propagation techniques for one-shot and few-shot image segmentation. Generally, a neural network may be used to predict a segmentation mask identifying pixels in a query image that belong to a particular class, based on one or more support image-mask pairs. Unlike prior techniques, in some embodiments, the network may predict segmentation masks for both the query image (query mask) and the support image (support mask). Accordingly, the neural network may include a query branch and a support branch that extract features from the query image (query features) and support image(s) (support features), respectively. A representation of foreground and/or background features of the support image(s) may be extracted and used to generate foreground and background attention maps, a pair from the query features in the query branch and a pair from the support features in the support branch. The foreground and background attention maps for the query and the support may be fused with the query and support features, respectively, which may be decoded using a shared decoder to extract a query mask a support mask.

As such, using implementations described herein, object detection may be performed with increased accuracy on classes of objects that were not represented during training. For example, a dual prediction scheme may be applied in which query and support masks are jointly predicted using a shared decoder, which aids in similarity propagation between the query and support features. Additionally or alternatively, foreground and background attentive fusion may be applied to utilize cues from foreground and background feature similarities between the query and support images. Finally, to prevent overfitting on class-conditional similarities across training classes, input channel averaging may be applied for the query image during training. Accordingly, the techniques described herein may be used to achieve state-of-the-art performance for both one-shot and few-shot segmentation tasks.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Figure 1:
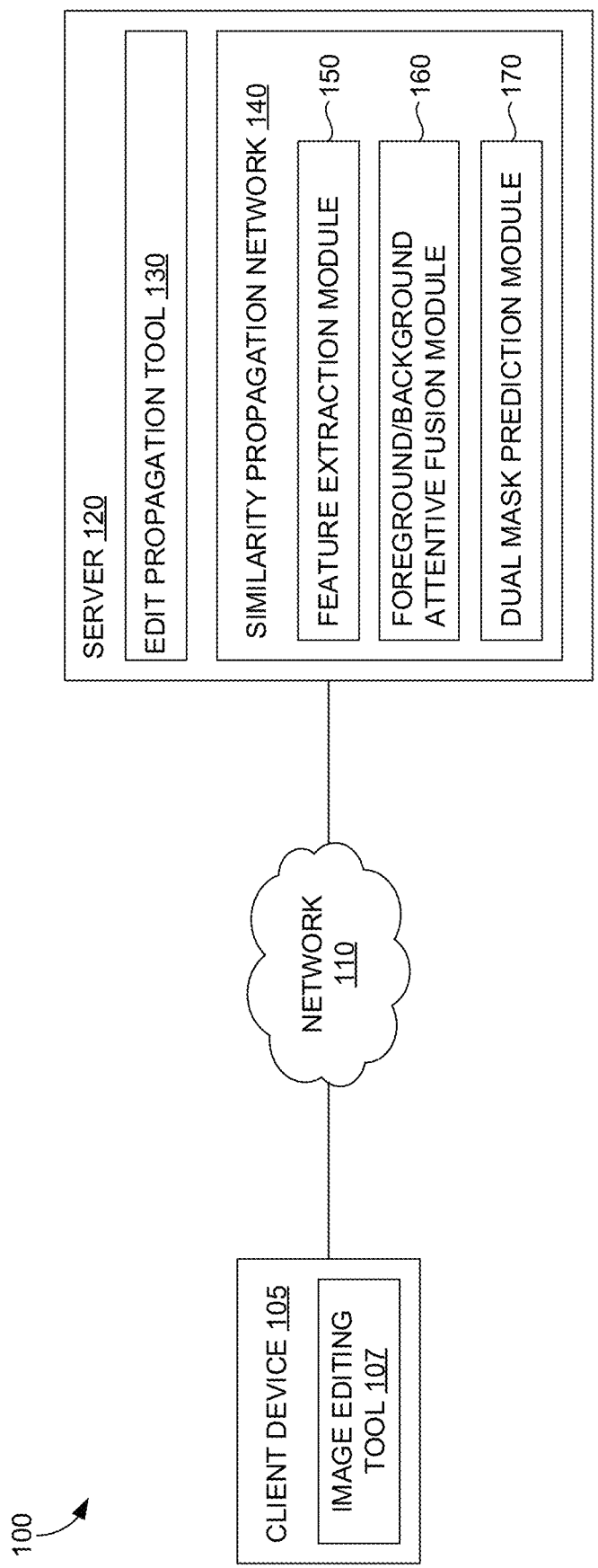
FIG. 1 is a block diagram of an example image segmentation system, in accordance with embodiments of the present invention.

Semantic image segmentation has a variety of applications, including image editing, medical diagnosis, and automated driving, to name a few examples. Consider an image editing example, in which a user such as a content manager seeks to perform batch editing on a collection of related images. For example, there are times when a user may want to apply the same kind of change to a batch of similar images. Some tools such as ADOBE® Experience Manager (AEM) allow brands to manage their image assets to build websites, mobile apps, and forms. In an example vertical market such as fashion, a collection of image assets may include images of catalog items such as shoes, shirts, pants, shorts, hats, etc. In other markets, image assets may depict goods, services, activities, resources, or some other item or unit. Common editing tasks for such images may involve extracting objects (e.g., image masking or performing image segmentation), background removal, and others. For example, a content manager may want to remove the background from 100 images. With many currently available tools, each of the 100 backgrounds would have to be manually removed in a tedious process requiring extensive repetition to create each of the image masks.

In some cases, a neural network that has been pre-trained to detect a particular class of object may be used to perform semantic image segmentation and extract image masks from a batch of images automatically. Using supervised learning, such neural networks can often perform accurate image segmentation. Typically supervised deep neural networks are trained on some limited number of classes (e.g., 1000), and the neural network does not work for other classes (e.g., the $1001^{st}$ class). That is, supervised deep neural networks generally only work for the object classes that were represented in the training dataset. For example, suppose a batch of images depict a class of objects such as laptops where there is not a readily available neural network that has been pre-trained to detect laptops. In this case, there may not be a supervised network available that can perform this task. Furthermore, to train such a network generally requires a large number of image-mask pairs, which would be hard to annotate manually, again involving a tedious process requiring extensive repetition. However, in many cases, it may be infeasible to obtain a sufficient number of image-mask pairs. For example, in several practical scenarios, including online commerce and design, the only practically available candidate training dataset may include a large number of sparsely populated classes (for instance, images of a variety of products). In such cases, there may not be a sufficient number of image-mask pairs to train a supervised method to detect objects in a particular class of interest. As such, continuing with the example above, a content manager desiring to remove the background from 100 images of laptops may have to create image masks manually in order to remove the backgrounds.

Few-shot segmentation is an image segmentation technique that can generalize to new classes, so it may be useful in situations where training data is limited. Generally, few-shot image segmentation may predict a binary segmentation mask identifying pixels in a query image that belong to a particular class, based on example images (support images) and corresponding segmentation masks (support masks) that identify pixels in the example images that belong to the same class. Whereas few-shot segmentation uses a few support image-mask pairs, one-shot segmentation uses only a single support image-mask pair. Some techniques apply a common segmentation framework to handle k-shot segmentation (k>1). As such, one-shot segmentation may be understood as a special case of few-shot segmentation. In any event, few-shot and one-shot image segmentation techniques are generally class-agnostic and alleviate the need for a large number of example image-mask pairs of a desired class.

Recent few-shot segmentation (FSS) techniques that use deep neural networks generally operate by extracting features from query and support images using shared, pre-trained (e.g., on ImageNet) network layers. Features from the support images (in the support mask regions) are processed to identify a probe representation of regions of attention in the support image. The probe representation is fused with the features of the query image, and the resulting fused features are decoded to generate a query mask—a segmentation mask of the query identifying regions of the query image that have an object(s) of the same class as the support image(s). Attention extraction and fusion rely on high-dimensional feature similarity between the query and support image(s) to selectively decode the features of the query image in generating the segmentation mask of the query.

Most FSS methods employ a dual branched neural network with a query branch for processing a query image and a support branch for processing a support image(s) and/or mask(s). In one formulation, the support branch is conditioned on the support input to predict weights for the last layer in the query branch, which then predicts a query mask. Some techniques apply a "late fusion" strategy, which fuses information extracted from the support set with the features of the query image. For example, some techniques apply masked average pooling (MAP) to pool support features of regions of interest in the support image(s). One technique fuses these pooled features with features of the query image using vector cosine-similarity to generate an attention map, which is then decoded to predict the query mask. Another technique concatenates the pooled features with features of the query image, and decodes the result to predict the query mask.

Conventional FSS techniques suffer from a variety of drawbacks. Generally, FSS techniques rely on support image(s) and/or support mask(s) to generate a segmentation mask for a query image. However, conventional FSS techniques often make errors in the predicted query mask (i.e., false negatives/missed regions, false positives/incorrectly predicted regions). Some of the errors occur in regions where supervised methods generally do not fail, which suggests that conventional FSS techniques fail in regions that may not be difficult to segment. Furthermore, for mispredicted regions, similarity between corresponding regions of the query and support images can be quantified (e.g., by comparing masked average pooling vectors for the corresponding regions). The high value of relative similarity between query and support images in mispredicted regions suggests that conventional techniques fail to make use of relevant support information in regions where the query and support images are visually similar. Moreover, conventional FSS techniques often perform poorly when the support is identical to the query (i.e., the same image is used for both the query image and the support image). These results suggest that conventional FSS techniques do not optimally propagate class and visual similarity information between the support and query branches, and that conventional FSS techniques fail to utilize support information efficiently. As a result, there is a need for improved semantic image segmentation techniques that more efficiently use support information from support image(s) and/or support mask(s) and produce more accurate segmentation masks.

Accordingly, embodiments of the present invention are directed to image segmentation, and more specifically, improved similarity propagation techniques for one-shot and few-shot image segmentation. Generally, a neural network may be used to predict a binary segmentation mask identifying pixels in a query image that belong to a particular class, based on one or more example images (support images) and corresponding segmentation masks (support masks) that identify pixels in the example images that belong to the same class. Unlike prior techniques, in some embodiments, the network may predict segmentation masks for both the query image (query mask) and the support image (support mask). Accordingly, the neural network may include a query branch and a support branch that extract features from the query image (query features) and support image(s) (support features), respectively. A representation of foreground and/or background features of the support image(s) may be extracted and used to generate foreground and background attention maps, a pair from the query features in the query branch and a pair from the support features in the support branch. The foreground and background attention maps for the query and the support may be fused with the query and support features, respectively, which may be decoded using a shared decoder to extract a query mask and a support mask.

More specifically, in some embodiments, rather than simply focusing on information from the foreground of the support image(s), the support branch may additionally or alternatively extract information from the background of the support image(s) and use the support background information as a probe. Typically, when segmenting a particular class (e.g., airplanes), backgrounds scenes have some amount of similarity (e.g., the sky). By pooling background features of the support image(s) and using the resulting representation to probe a query image (e.g., by generating a background attention map and fusing the background attention map into the query branch), the present techniques make use of pertinent visual information that has not previously been used in one-shot and few-shot segmentation. Since this visual background information is often useful to help identify pixels that are in a particular class, embodiments that consider background information from the support image(s) improve the accuracy of predicted segmentation masks over prior techniques.

Furthermore, some embodiments may predict segmentation masks for both the query image and the support image using a shared decoder in the query and support branches. For example, the query and support branches may each process corresponding image features from a query image and support image to generate a corresponding mask. Each branch may use a shared encoder (e.g., at least partially pre-trained) to extract image features (e.g., a feature volume), probe the extracted image features using foreground and/or background probes to generate foreground and/or background attention maps, fuse the foreground and background attention maps with the extracted image features, and decode the fused features using a shared decoder. The query and support branches may be executed in parallel, and may be trained together using a combined loss from each branch. By predicting a support mask in addition to a query mask, and adding a loss term for the new output, the neural network can learn to propagate support information from the support branch to the query branch more efficiently than prior techniques, therefore improving the accuracy of predicted masks.

Generally, a neural network implemented using the techniques described herein may generalize to new classes. More specifically, the neural network (e.g., the fusion and decoder parts of the neural network) may be trained using a training dataset that represents some limited number of classes, and in operation, the network may be applied to other unseen classes. In some embodiments, to prevent the neural network from overfitting on the training classes, input channel averaging may be used. For example, during training, rather than inputting RGB images into the query and support branches, the query image may be converted to a greyscale image (e.g., with normalization), for example, by averaging constituent RGB color values. In some embodiments, the query image may be converted to greyscale with a switch probability that decays (e.g., exponentially) as training progresses. Applying an input regularization technique such as input channel averaging during training can help the neural network stop fixating on color information. Since color image may highlight differences between query and support images, removing color information during training may help the network to focus more on structural information (e.g., shape), which effectively forces the network to focus more on similarity. Thus, by applying input channel averaging during training, the neural network can learn to propagate similarity information more efficiently than in prior techniques. As such, applying input channel averaging during training can improve prediction accuracy over prior techniques.

As such, using implementations described herein, one-shot and few-shot image segmentation may be used to perform object detection with increased accuracy on classes of objects that were not represented during training. For example, a dual prediction scheme may be applied in which query and support masks are jointly predicted using a shared decoder, which aids in similarity propagation between the query and support features. Additionally or alternatively, foreground and background attentive fusion may be applied to utilize cues from foreground and background feature similarities between the query and support images. Finally, to prevent overfitting on class-conditional similarities across training classes, input channel averaging may be applied for the query image during training. Accordingly, the techniques described herein may be used to achieve state-of-the-art performance for both one-shot and few-shot segmentation tasks.

Having briefly described an overview of aspects of the present invention, various terms used throughout this description are provided. Although more details regarding various terms are provided throughout this description, general descriptions of some terms are included below to provider a clearer understanding of the ideas disclosed herein:

As used herein, one-shot and few-shot segmentation generally refer to a task which uses knowledge about an example object class to locate objects in the same class from a query image. The knowledge about the example object class may be provided from one or more example images (support images) and corresponding segmentation masks (support masks) identifying pixels in the support image(s) that belong to a particular class of interest. One-shot and few-shot segmentation techniques seek to transfer knowledge about the class from the support to the query to predict a confidence map (e.g., with pixel values representing a probability, score, or logit that each pixel is part of the class) and/or a segmentation mask (e.g., with binary pixel values identifying pixels that are and are not in the class). One-shot and few-shot segmentation techniques may employ a dual branched neural network, including a query branch for processing a query image and a support branch for processing a support image-mask pair(s). Generally, one-shot segmentation uses a single support image-mask pair, whereas few-shot segmentation uses multiple support image-mask pairs.

As used herein, a neural network generally refers to a machine-learning model that learns to approximate unknown functions by analyzing example (e.g., training) data at different levels of abstraction. Generally, neural networks can model complex non-linear relationships by generating hidden vector outputs along a sequence of inputs. In particular, a neural network can include a model of interconnected digital neurons that communicate and learn to approximate complex functions and generate outputs based on a plurality of inputs provided to the model. A neural network can include a variety of deep learning models, including convolutional neural networks, recurrent neural networks, deep neural networks, and deep stacking networks, to name a few examples. A neural network may include or otherwise make use of one or more machine learning algorithms to learn from training data. In other words, a neural network can include an algorithm that implements deep learning techniques such as machine learning to attempt to model high-level abstractions in data. An example implementation may include a convolutional neural network including convolutional layers, pooling layers, and/or other layer types.

Example Image Segmentation Environment

Referring now to FIG. 1, a block diagram of example environment 100 suitable for use in implementing embodiments of the invention is shown. Generally, environment 100 is suitable for image segmentation, and, among other things, facilitates one-shot and few-shot image segmentation. Environment 100 includes client device 105 and server 120. Client device 105 and/or server 120 may be any kind of computing device capable of facilitating image segmentation. For example, in an embodiment, client device 105 and/or server 120 may be a computing device such as computing device 700, as described below with reference to FIG. 7. Generally, client device 105 and/or server 120 may be a personal computer (PC), a laptop computer, a workstation, a mobile computing device, a PDA, a cell phone, a server computer, or the like. The components of environment 100 may communicate with each other via network 110, which may include, without limitation, one or more local area networks (LANs) and/or wide area networks (WANs). Such networking environments are commonplace in offices, enterprise-wide computer networks, intranets, and the Internet.

In the example illustrated in FIG. 1, client device 105 includes image editing tool 107, and server 120 includes edit propagation tool 130. Generally, image editing tool 107 and/or edit propagation tool 130 may be incorporated, or integrated, into an application(s) (e.g., a corresponding application on client device 105 and server 120, respectively), or an add-on(s) or plug-in(s) to an application(s). The application(s) may generally be any application capable of facilitating image editing, and may be a stand-alone application, a mobile application, a web application, or the like. In some implementations, the application(s) comprises a web application, which can run in a web browser, and could be hosted at least partially server-side. In addition, or instead, the application(s) can comprise a dedicated application. In some cases, the application can be integrated into the operating system (e.g., as a service). One example application that may be used for image editing is ADOBE Experience Manager (AEM), which allows brands to manage their image assets to build websites, mobile apps, and forms. Although embodiments are described with image editing tool 107 and/or edit propagation tool 130 being associated with an application(s), this need not be the case. Generally, image editing tool 107 and/or edit propagation tool 130, or some portion thereof, may additionally or alternatively be integrated into an operating system (e.g., as a service), a server (e.g., a remote server), a distributed computing environment (e.g., as a cloud service), or otherwise.

To begin with a high level overview of an example workflow through the configuration illustrated in FIG. 1, a user may use image editing tool 107 to perform, specify, or otherwise provide an indication of a desired edit to a first image using any known editing technique. The user may further use image editing tool 107 to provide an indication to propagate the edit to one or more target images, upon which image editing tool 107 may coordinate with edit propagation tool 130 (e.g., via network 110) to propagate the edit to the target images. In some cases, this process may be thought of as batch editing, where a user performs an edit, and the edit is propagated to a batch of target images. Generally, any allocation of functionality may be implemented across any number of devices. In the example illustrated in FIG. 1, an application that supports image editing may be hosted at least partially server-side, such that image editing tool 107 and edit propagation tool 130 coordinate to perform batch editing. In another example, image editing tool 107 and edit propagation tool 130 may be integrated into a common application executable on a single device. These are just examples, and any suitable allocation of functionality among these or other devices may be implemented.

Generally, image editing tool 107 may use any suitable technique to receive edits to a sample image, and an indication to transfer an edit to one or more target images. For example, image editing tool 107 may cause presentation of a user interface, such as a graphical user interface, with selectable interaction elements that accept a selection of a sample image, an edit to the sample image, a selection of one or more target images, and/or an indication to transfer the edit to the one or more target images (e.g., using corresponding buttons, menu items, or other interaction elements). Any suitable user interface may be implemented within the scope of the present disclosure.

Upon receiving an indication to transfer a particular edit to one or more target images, image editing tool 107 may cause edit propagation tool 130 to transfer the edits. Generally, edit propagation tool 130 may use any suitable technique to transfer edits from a sample image to a target image, and the technique may depend on the type of edit. For example, if a user performs a crop operation on a sample image (e.g., using image editing tool 107), edit propagation tool 130 may apply a proportional crop operation on each target image in a designated collection of target images. In another example, if a user adds text to a sample image (e.g., using image editing tool 107), edit propagation tool 130 may add the same text using a corresponding proportional size and at a corresponding relative location of each target image in a designated collection of target images. In some cases, the collection of target images may be refined by identifying images from the target collection having an identified similarity with the sample image (e.g. based on an analysis of structural similarity), target images having a threshold similarity with the sample image may be grouped together, and the remaining target images may be removed from the collection such that the edit made to the sample image is only propagated to target images having a threshold similarity with the sample image.

In some embodiments, edit propagation tool 130 may propagate an edit made to a selected object, a selected foreground, or a corresponding background of a sample image. For example, a user may use image editing tool 107 to identify a boundary (e.g., an object boundary, a foreground boundary) or corresponding enclosed region in a sample image using any suitable selection tool (e.g., a rectangular selection tool, an elliptical selection tool, lasso, polygonal lasso, magnetic lasso, a magic wand that selects a consistently colored area, etc.). The user may further use image editing tool 107 to perform some edit on the selected object or foreground (e.g., an adjustment to lighting such as exposure or contrast, an adjustment to color such as saturation or into, an adjustment to transparency or opacity, application of some other filter), on the background (e.g., removing or changing the color of the background, application of some other filter), and/or the like. Whether prior to, or after, editing one or more sample images, the user may use image editing tool 107 to provide an indication to propagate the sample edit(s) to one or more target images (e.g., via a button, menu item, or other interaction element). In this case, image editing tool 107 may cause edit propagation tool 130 to transfer the selected boundary or region to the target image(s) and apply the sample edit to the corresponding region (e.g., selection, or inverse selection) of the target images.

In order to transfer a selected boundary or region from one or more sample images to one or more target images, edit propagation tool 130 may invoke a neural network, such as similarity propagation network 140. Generally, similarity propagation network 140 may perform one-shot and/or few-shot segmentation to transfer knowledge about a particular class from a sample image in order to predict a confidence map and/or segmentation mask for a query image. For example, a selected boundary or region from a sample image may be used to generate a corresponding support mask (e.g., by setting binary pixel values indicating whether each pixel is inside or outside the selected boundary or region), and the sample image (e.g., that the user edited) may be used as a support image. For each target image, edit propagation tool 130 may invoke similarity propagation network 140 by feeding the support image(s) and support mask(s) (a support image-mask pair(s)) into a support branch of similarity propagation network 140, and feeding the target image into a query branch of similarity propagation network 140 as a query image. Similarity propagation network 140 may perform a feedforward pass to predict one or more confidence maps (e.g., with pixel values representing a probability, score, or logit that each pixel is part of the class identified by the support mask) and/or segmentation masks (e.g., with binary pixel values identifying pixels that are and are not in the class identified by the support mask). For example, similarity propagation network 140 may predict a confidence map, which may be used to generate a corresponding segmentation mask (e.g., by labeling pixels having some threshold probability, score, or logit as being part of the class). The segmentation mask may identify a predicted region of the query image (i.e., the target image) that is part of the class identified by the support mask. In some cases, the prediction region (or its inverse) may be output. Additionally or alternatively, the boundary of the predicted region may be identified (e.g., using any known boundary detection technique). Edit propagation tool 130 may repeat the process for each target image to transfer a selected boundary or region from a sample image(s) to the target image.

At a high level, similarity propagation network 140 may include a query branch for processing a query image and a support branch for processing a support image(s) and/or mask(s). Generally, the query branch and the support branch may share one or more components. For example, in the embodiment illustrated in FIG. 1, similarity propagation network 140 includes feature extraction module 150, foreground/background attentive fusion module 160, and dual mask prediction module 170. Feature extraction module 150 may include a shared encoder, which may be shared by the query and support branches to extract image features (e.g., an instance of the same encoder may be spawned by each branch to extract features from a query image and a support image, respectively). Foreground/background attentive fusion module 160 may extract a foreground probe and/or a background probe from the support image(s), generate corresponding foreground and/or background attention maps, and/or fuse the attention map(s) with extracted image features using a shared fusion network, which may be shared by the query and support branches (e.g., an instance of the same fusion network may be spawned by each branch to fuse attention map(s) with extracted image features from the query image and support image, respectively). Dual mask prediction module 170 may include a shared decoder, which may be shared by the query and support branches to decode fused features into a corresponding confidence map and/or segmentation mask (e.g., an instance of the same decoder may be spawned by each branch to predict a segmentation mask for the query image and the support image, respectively).

Figure 2:
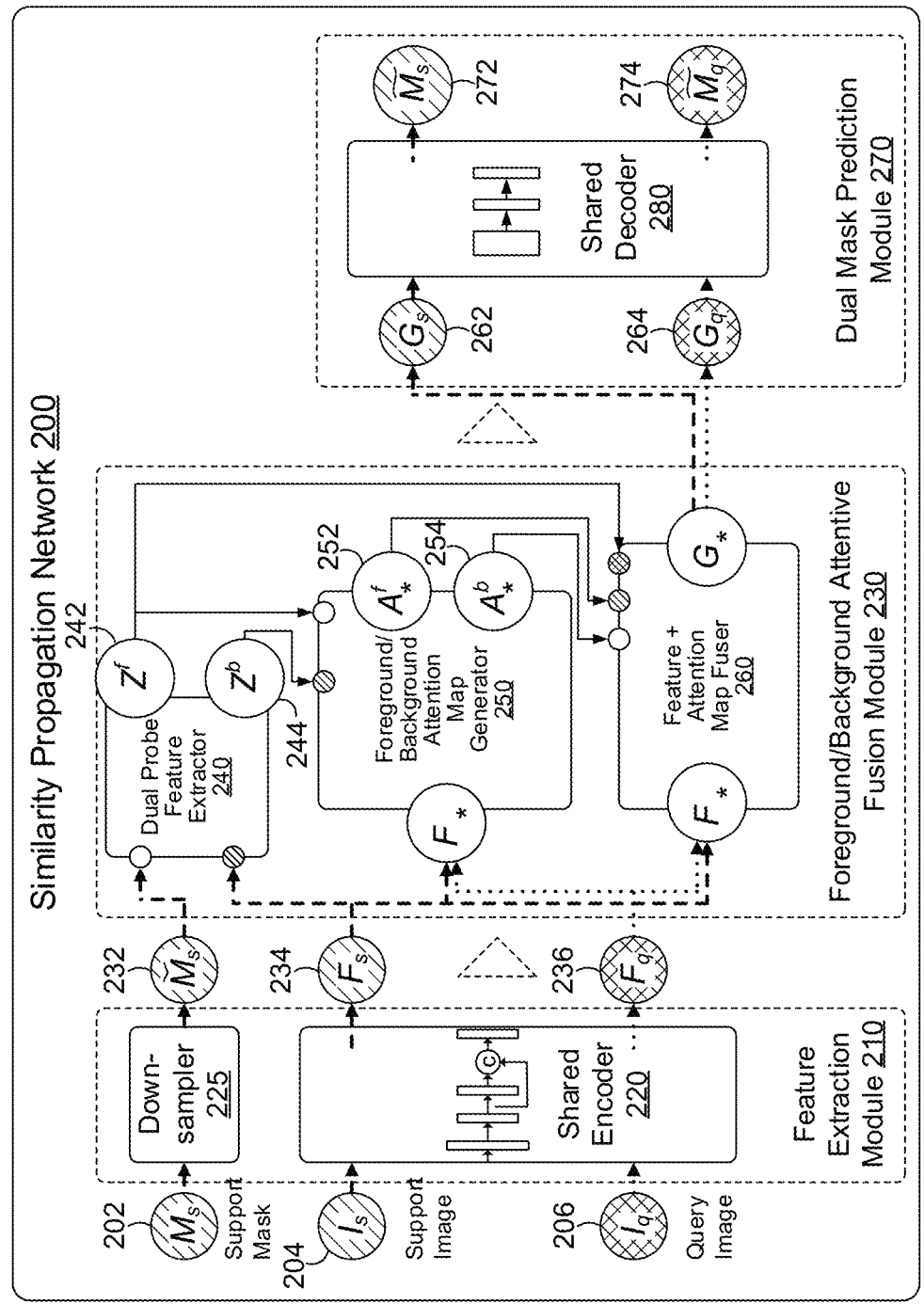
FIG. 2 is a data flow diagram illustrating an example similarity propagation network, in accordance with embodiments of the present invention.

FIG. 2 is a data flow diagram illustrating an example similarity propagation network 200, in accordance with embodiments of the present invention. In this example, similarity propagation network 200 includes feature extraction module 210, foreground/background attentive fusion module 230, and dual mask prediction module 270. Similarity propagation network 200 and its constituent components may correspond with the implementation of similarity propagation network 140 depicted in FIG. 1. In FIG. 2, similarity propagation network 200 includes a query branch for processing a query image (denoted by the dotted arrows) and a support branch for processing a support image(s) and/or mask(s) (denoted by the dashed arrows).

Feature extraction module 210 includes shared encoder 220 and downsampler 225. Generally, shared encoder 220 may be used to extract features from a particular input image. In some embodiments, shared encoder 220 may be implemented using a neural network, such as a convolutional neural network. Shared encoder 220 may include any number of convolutional layers, pooling layers, and/or other layer types. In an example embodiment, shared encoder 220 may comprise three layers from a pre-trained network (e.g., ResNet-50), a concatenation operation (e.g., concatenating the input to the third layer with the output of the third layer), and a subsequent layer (e.g., a 3×3 dilated convolutional layer with 256 filters). In embodiments that include one or more pre-trained layers and one or more subsequent layers that are not pre-trained, training similarity propagation network 200 may involve updating network weights for the untrained layers without updating network weights for the pre-trained layers (e.g., the pre-trained layers may be frozen during training).

In some cases, shared encoder 220 may be considered to be shared in the sense that a query image and a support image may be separately encoded into corresponding images feature using the same shared encoder 220 (e.g., by running parallel instances of shared encoder 220, one in the support branch and one in the query branch. Thus, shared encoder 220 may be used to extract image features (e.g., a feature volume) for a particular input image. By way of nonlimiting example, if a particular image has a dimensionality of 256×256×3 (e.g., three 256×256 RGB channels), an example shared encoder with 256 filters may extract a feature volume having a dimensionality of 65×65×256. Thus, a support branch of similarity propagation network 200 may use shared encoder 220 to extract support features $F_s$ 234 from support image 204, and a query branch of similarity propagation network 200 may use shared encoder 220 to extract query features $F_q$ 236 from query image $I_Q$ 206.

Downsampler 225 may resize support mask 202 to match the dimensionality (e.g., height/width) of the extracted image features (support features $F_s$ 234 and/or query features $F_q$ 236). For example, downsampler 225 may perform bilinear downsampling on support mask 202 in the height and/or width dimensions, and may replicate the result across all depth channels to extract support mask features $\tilde{M}_s$ 232 having the same dimensionality as the extracted image features. By way of nonlimiting example, to match a feature volume of 65×65×256, a single channel support mask with binary values may be downsampled to a dimensionality of 65×65, and the downsampled values may be replicated across all 256 depth channels. Although this example involves bilateral downsampling, generally, any dimensionality reduction or matching technique may be applied to facilitate aligning one or more channels of extracted image features with extracted support mask features.

Figure 3:
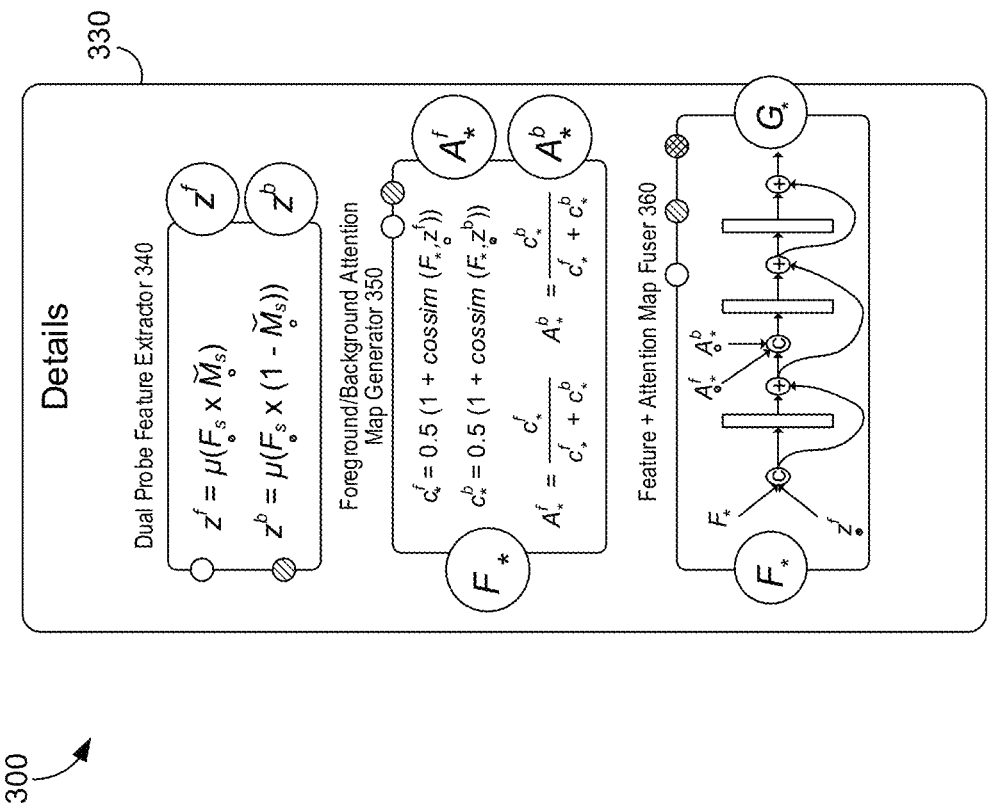
FIG. 3 is a block diagram illustrating an example foreground/background attentive fusion module, in accordance with embodiments of the present invention.

Continuing with the example illustrated in FIG. 2, foreground/background attentive fusion module 230 includes dual probe feature extractor 240, foreground/background attention map generator 250, and feature+attention map fuser 260. FIG. 3 illustrates a more detailed example foreground/background attentive fusion module 330 with components that may correspond with the components of foreground/background attentive fusion module 230 of FIG. 2. In FIGS. 2 and 3, corresponding inputs and outputs are depicted by similarity labeled and/or hatched circles. The following discussion references both FIGS. 2 and 3.

Dual probe feature extractor 240 (and/or dual probe feature extractor 340) may extract a foreground and/or a background probe from a support image. More specially, dual probe feature extractor 240 may generate a representation of foreground features and/or a representation of background features of a support image, for example, by pooling foreground and background features of the support image, respectively. Each representation may use any suitable structure, such as a vector, array, matrix, or tensor, to name a few examples. Generally, each representation may be considered to be a probe, since it may be used to probe an image, as described in more detail below. More specifically, dual probe feature extractor 240 may extract foreground probe $z^f$ 242 and background probe $z^b$ 244 from support mask features $\tilde{M}_s$ 232 and support features $F_s$ 234. In some embodiments, dual probe feature extractor 240 may pool foreground and background features of the support image, for example, using a masked average pooling (MAP) operation. Generally, the MAP operation may comprise a channel-wise weighted average of support features $F_s$ 234, where the weights are support mask features $\tilde{M}_s$ 232 values at each pixel.

To extract foreground features, support features $F_s$ 234 and support mask features $\tilde{M}_s$ 232 may be aligned and multiplied through the channels. For example, where support features $F_s$ 234 are a feature volume with height, width, and depth, and support mask features $\tilde{M}_s$ 232 are a feature volume that replicates a downsampled mask across all depth channels, aligning and performing an element-wise multiplication may have the effect of selecting the portion of support features $F_s$ 234 that represents a foreground or a selected object. The resulting columns corresponding to the pixels in the support mask may be pooled, for example, by averaging. In some embodiments, masked average pooling may be applied to produce a vector (e.g., in the depth dimension). Continuing with the example above, a support feature volume of 65×65×256 may be reduced to a MAP vector (e.g., foreground probe $z^f$ 242) with dimensionality of 1×1×256. A similar process may be applied to the inverse of support mask features $\tilde{M}_s$ 232 to extract background probe $z^b$ 244. Thus, foreground probe $z^f$ 242 and background probe $z^b$ 244 may be obtained by:

$$z^f = \mu_c(F_s * \tilde{M}_s) \tag{1}$$

$$z^b = \mu_c(F_s * (1 - \tilde{M}_s)) \tag{2}$$

where $F_s$ are the support features (e.g., support features $F_s$ 234), $\tilde{M}_s$ is the support mask downsampled to the height and width of $F_s$ (e.g., support mask features $\tilde{M}_s$ 232), and $\mu_c$ is an average pooling operation with a kernel size equal to the size of a feature map from $F_s$.

In the example illustrated in FIG. 3, dual probe feature extractor 340 illustrates an example implementation of dual probe feature extractor 240 using equations 1-2.

Foreground/background attention map generator 250 (and/or foreground/background attention map generator 350) may probe extracted image features (query features $F_q$ 236 and support features $F_s$ 234) using foreground probe $z^f$ 242 and/or background probe $z^b$ 244 to generate foreground and/or background attention maps. For example, in some embodiments, the query and support branches of similarity propagation network 200 may each generate a pair of foreground and background attention maps, a pair corresponding to query image 206 and a pair corresponding to support image 204. In some cases, foreground and/or background maps may be generated by running parallel instances of the same routine (e.g., one in the support branch and one in the query branch).

To generate an attention map for a particular image, foreground/background attention map generator 250 may probe extracted image features from the image to generate a measure of similarity (e.g., using cosine similarity). Taking the query branch as an example, foreground/background attention map generator 250 may generate foreground and background attention maps $A_q^f$ and $A_q^b$, by probing the query features $F_q$ 236 with the foreground probe $z^f$ 242 and background probe $z^b$ 244, respectively. In the support branch, foreground/background attention map generator 250 may generate foreground and background attention maps $A_s^f$ and $A_s^b$, by probing the support features $F_s$ 234 with the foreground probe $z^f$ 242 and background probe $z^b$ 244, respectively. In FIG. 2, the star in $A_*^f$ 252 and $A_*^b$ 254 denotes that foreground and background attention maps may be generated in each of the query branch (*=q) and/or in the support branch (*=s). Thus, foreground and background attention maps $A_q^f$, $A_q^b$, $A_s^f$, and $A_s^b$ may be obtained by:

$$C(F,z) = (1 + \cos sim(F,z))/2 \tag{3}$$

$$N(A,B) = (A/(A+B), B/(A+B)) \tag{4}$$

$$A_q^f, A_q^b = N(C(F_q, z^f), C(F_q, z^b)) \tag{5}$$

$$A_s^f, A_s^b = N(C(F_s, z^f), C(F_s, z^b)) \tag{6}$$

where cos sim is an element-wise cosine similarity operation that produces a scaler value for each pixel.

Continuing with the example above, where $F_q$ (e.g., query features $F_q$ 236) and $F_s$ (e.g. support features $F_s$ 234) are feature volumes with dimensionality of 65×65×256, and $z^f$ (e.g., foreground probe $z^f$ 242) and $z^b$ (e.g. background probe $z^b$ 244) are MAP vectors with dimensionality of 1×1×256, foreground and background attention maps $A_q^f$, $A_q^b$, $A_s^f$, and $A_s^b$ may be generated as single channel outputs with the same height/width as the feature volumes, e.g., 65×65×1. Generally, a foreground attention map may represent where to pay attention to the foreground, a background attention map may represent where to pay attention to the background, and the sum of $A^f + A^b$ may equal one for each pixel. In the example illustrated in FIG. 3, foreground/background attention map generator 350 illustrates an example implementation of foreground/background attention map generator 250.

Having generated a representation(s) of where to pay attention to the background and/or foreground, feature+attention map fuser 260 (and/or feature+attention map fuser 360) may fuse any or all of these representations with corresponding extracted image features to generate fused features, for example, using a shared fusion network. For example, in the query branch, feature+attention map fuser 260 may fuse query features $F_q$ 236 with foreground and background attention maps $A_q^f$, $A_q^b$ for the query. In the support branch, feature+attention map fuser 260 may fuse support features $F_s$ 234 with foreground and background attention maps $A_s^f$, $A_s^b$ for the support image(s). For example, in some embodiments, parallel instances of the same fusion network may be spawned by the query and support branches to fuse attention map(s) with extracted image features from the query image and support image, respectively. The fusion network may be implemented using any number of convolutional layers, pooling layers, and/or other layer types. Generally, fusing background feature information from the support branch may have the effect of suppressing similar background features in the fused representation.

In the example illustrated in FIG. 3, feature+attention map fuser 360 illustrates an example implementation of feature+attention map fuser 260. In some embodiments, feature+attention map fuser 360 may be implemented using a neural network, such as a convolutional neural network. In the example illustrated in FIG. 3, feature+attention map fuser 360 includes an example fusion network comprising concatenation operations (denoted by the letter C), convolutional layers (e.g., 3×3 with dropout), and addition/instance normalization operations (denoted by the plus sign). Generally, to fuse different types of information together, the information may be concatenated and convolved, and the concatenated input may be combined with the convolved output using a skip connection. This way, the fused information may be passed through the network using concatenation operations and skip connections. In some embodiments, instance normalization may be applied. Generally, instance normalization may recalibrate by removing components of features that change over time, for example, using some statistical measure such as mean and/or variance (e.g., (x-mean)/variance). Generally, since this process may be used to combine attention maps with image features, the process may be referred to as attentive fusion.

In FIGS. 2 and 3, the star in $F_*$, $A_*^f$, $A_*^b$, and $G_*$ denotes that attentive fusion may be performed in each of the query branch (*=q) and/or in the support branch (*=s). For example, in the query branch, query features $F_q$ 236 may be concatenated with the foreground probe $z^f$ 242, passed through a convolutional layer, concatenated with foreground and background attention maps $A_q^f$, $A_q^b$ for the query, and passed through any number of convolutional layers, instance normalization layers, and/or other layers to generate fused query features $G_q$ 264. In the support branch, support features $F_s$ 234 may be concatenated with the foreground probe $z^f$ 242, passed through a convolutional layer, concatenated with foreground and background attention maps $A_s^f$, $A_s^b$ for the support image(s), and passed through any number of convolutional layers, instance normalization layers, and/or other layers to generate fused support features $G_s$ 262.

Returning now to FIG. 2, dual mask prediction module 270 includes shared decoder 280. Generally, shared decoder 280 may be used to decode fused image features from a particular input image into a confidence map and/or segmentation mask (e.g., query mask $\tilde{M}_q$ 274 and support mask $\tilde{M}_s$ 272). In some embodiments, shared decoder 280 may be implemented using a neural network, such as a convolutional neural network. Shared decoder 280 may include any number of convolutional layers, pooling layers, and/or other layer types. In an example embodiment, shared decoder 280 may comprise an atrous spatial pyramid pooling layer, and two convolutional layers, where the last layer may include a linear activation. Since the stream of layers may result in an output having some reduced size (e.g., based on kernel size for each of the layers), the predicted output from the last layer may be resized (e.g., using bilinear interpolation) to generate a confidence map and/or segmentation mask with dimensions (e.g., height/width) that match the input image.

As such, in some embodiments, similarity propagation network 200 may jointly predict confidence maps and/or segmentation masks for the query image and the support image(s), for example, by spawning and executing parallel instances of the components in the query and support branches (e.g., using separate processors, such as graphics processing units (GPUs)). To train similarity propagation network 200, any suitable training dataset may be used, such as the PASCAL Visual Object Classes dataset. Generally, the network may be trained on any number of classes. In some embodiments, to prevent the network from overfitting on the training classes, input channel averaging may be used. For example, during training, rather than inputting RGB images into the query and support branches, the query image may be converted to a greyscale representation image (e.g., after normalizing), for example, by averaging constituent RGB color values. In some embodiments, the query image may be converted to greyscale with a switch probability that decays (e.g., exponentially) as training progresses. In any event, predicted maps/masks for the query and the support image(s) may be compared to their respective ground-truths using any suitable loss function (e.g., cross-entropy loss), and the loss from each branch may be combined (e.g., added) and used to update network weights. In embodiments that include pre-trained network layers (e.g., some or all of shared encoder 220), the pre-trained layers may be frozen during training. Since training may not always be stable and performance may decay during later training steps, in some embodiments, network performance may be monitored, and training may be stopped when network performance plateaus.

The foregoing discussion outlined a scenario with a single support image-mask pair (e.g., one-shot segmentation). To incorporate more than one support image-mask pair during inference (e.g., few-shot segmentation), probes (e.g., MAP vectors) may be generated for each support image-mask pair, and the probes may be combined (e.g., averaged). For example, a foreground probe may be extracted from each support image-mask pair, and the resulting foreground probes may be averaged to generate a composite foreground probe. Additionally or alternatively, a background probe may be extracted from each support image-mask pair, and the resulting background probes may be averaged to generate a composite background probe. Since the probes may all have the same dimensionality, combining probes may be equivalent to averaging in each dimension separately. The composite foreground and/or background probes may be used in place of the individual foreground probe and/or background probe in the single support image-mask pair example described above. Namely, the composite foreground and/or background probes may be used to compute foreground and background attention maps, which may be fused with extracted image features and decoded to predict a confidence map and/or segmentation mask.

As such, and returning to the batch editing example described respect to FIG. 1 above, edit propagation tool 130 may use similarity propagation network 140 to transfer a selected boundary or region from one or more sample images to a target image by generating a support mask from a selected boundary, feeding the sample image and support mask into the support branch of similarity propagation network 140, and/or feeding the target image into the query branch of similarity propagation network 140. As such, similarity propagation network 140 may perform a feedforward pass to predict a confidence map and/or a segmentation mask for the query image (e.g. a predicted mask for the target image) and/or for the support image.

In some situations, the benefits that result from jointly predicting maps/masks for the query and support may be realized during training and reflected in network weights. As such, in some cases, there may be no need to predict a support map/mask during inference. Accordingly, in some embodiments, some of the operations of the support branch that are not necessary for predicting a query map/mask (e.g., generating and fusing attention maps for the support, decoding fused support features) may be omitted during inference to reduce the expenditure of computational resources. Additionally or alternatively, some computations may be reused to avoid unnecessarily recomputing the same values (e.g., generate support features, support mask, foreground probe, and background probe once for all target images). These are just a few implementation examples, and other variations may be implemented within the scope of the present disclosure.

Figure 4:
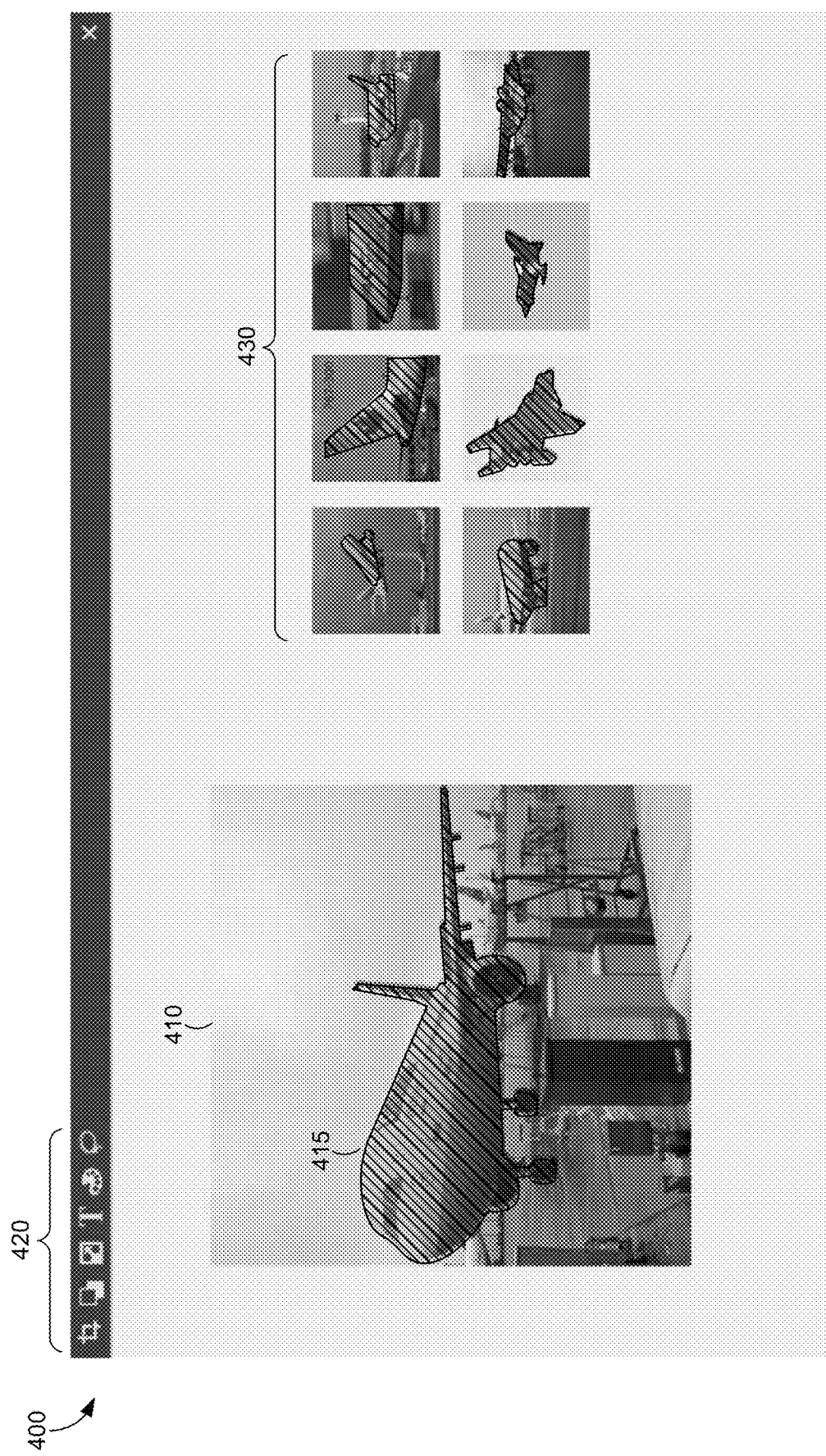
FIG. 4 is an illustration of an example batch editing interface, in accordance with embodiments of the present invention.

FIG. 4 is an illustration of an example batch editing interface 400, in accordance with embodiments of the present invention. In this example, interface 400 includes sample image 410, some editing tools 420, and a collection of target images 430. In FIG. 4, sample image 410 is illustrated with an example mask 415, which may be generated by drawing a closed boundary around the plane (e.g., using a lasso tool). Upon receiving an indication to propagate the boundary from sample image 410 to the collection of target images 430 (e.g., via an interaction element, not depicted), the boundary or region (e.g., example mask 415) may be transferred to the collection of target images 430 (e.g., via edit propagation tool 130 of FIG. 1). The collection of target images 430 are illustrated in FIG. 4 with example masks predicted using one-shot segmentation using example mask 415 of sample image 410 as a support image-mask pair, in accordance with techniques described herein.

Example Flow Diagrams

Figure 5:
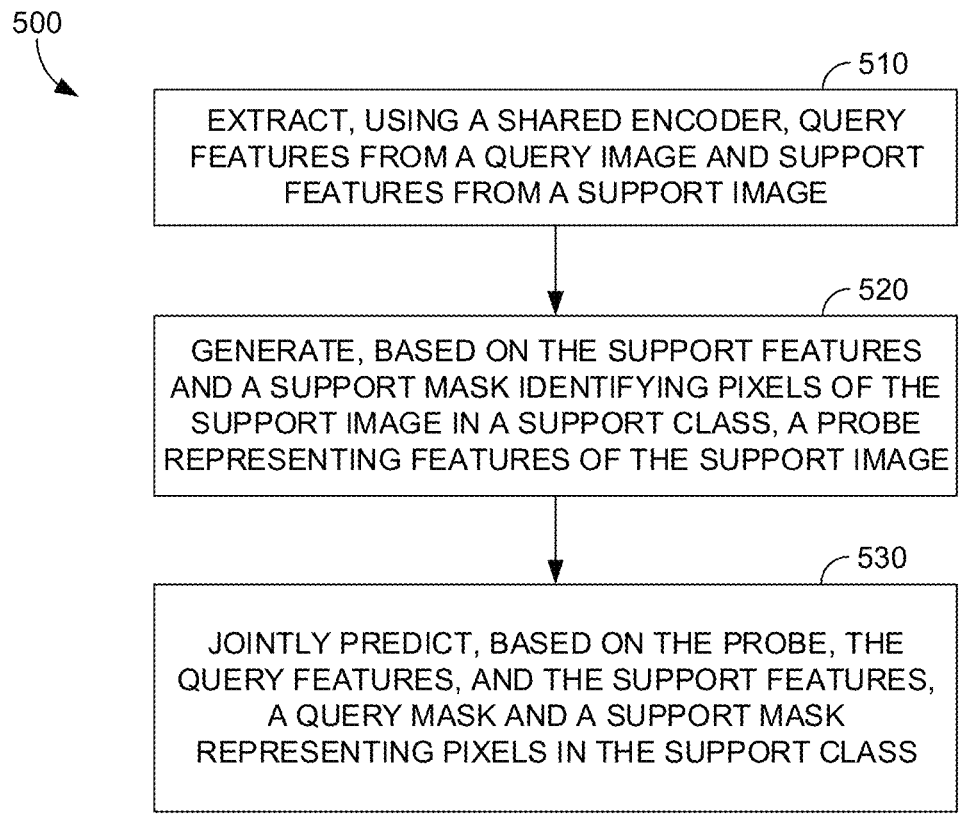
FIG. 5 is a flow diagram showing a method for generating a query mask and a support mask, in accordance with embodiments of the present invention.
Figure 6:
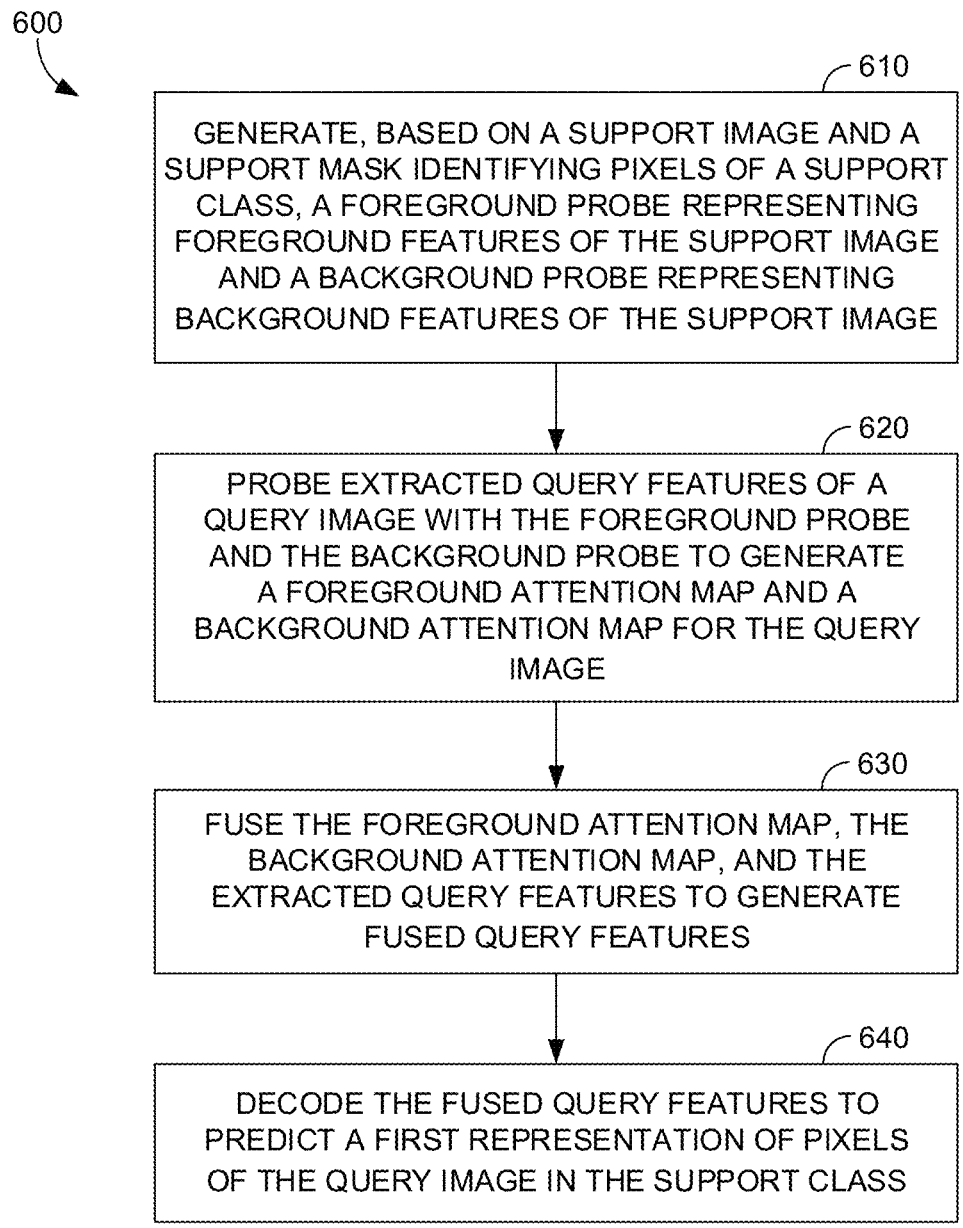
FIG. 6 is a flow diagram showing a method for predicting pixels in a support class, in accordance with embodiments of the present invention.

With reference now to FIGS. 5-6, flow diagrams are provided illustrating methods for predicting pixels in a support class. Each block of the methods 500 and 600 and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning initially to FIG. 5, FIG. 5 illustrates a method 500 for generating a query mask and a support mask, in accordance with embodiments described herein. Initially at block 510, a shared encoder is used to extract query features from a query image and support features from a support image. At block 520, a probe representing features of the support image is generated based on the support features and a support mask identifying pixels of the support image in a support class. In some embodiments, a foreground probe and a background probe may be generated, where the foreground probe represents foreground features of the support image, and the background probe represents background features of the support image. At block 530, a query mask and a support mask representing pixels in the support class are jointly predicted based on the probe, the query features, and the support features. For example, the probe may be used to generate an attention map representing regions of attention of the query image, the attention map for the query image may be fused with the query features to generate fused query features, and the fused query features may be decoded into a query mask using a shared decoder. Similarly, the probe may be used to generate an attention map representing regions of attention of the support image, the attention map for the support image may be fused with the support features to generate fused support features, and the fused support features may be decoded into a support mask using the shared decoder.

Turning now to FIG. 6, FIG. 6 illustrates a method 600 for predicting pixels in a support class, in accordance with embodiments described herein. Initially at block 610, a foreground probe representing foreground features of the support image and a background probe representing background features of the support image are generated based on a support image and a support mask identifying pixels of a support class. For example, the support mask may be downsampled and used to pool the foreground features of the support image and the background features of the support image. At block 620, extracted query features of a query image are probed with the foreground probe to generate a foreground attention map, and the extracted query features are probed with the background probe to generate a background attention map. At block 630, the foreground attention map, the background attention map, and the extracted query features are fused to generate fused query features. At block 640, the fused query features are decoded to predict a first representation of pixels of the query image in the support class.

Example Operating Environment

Figure 7:
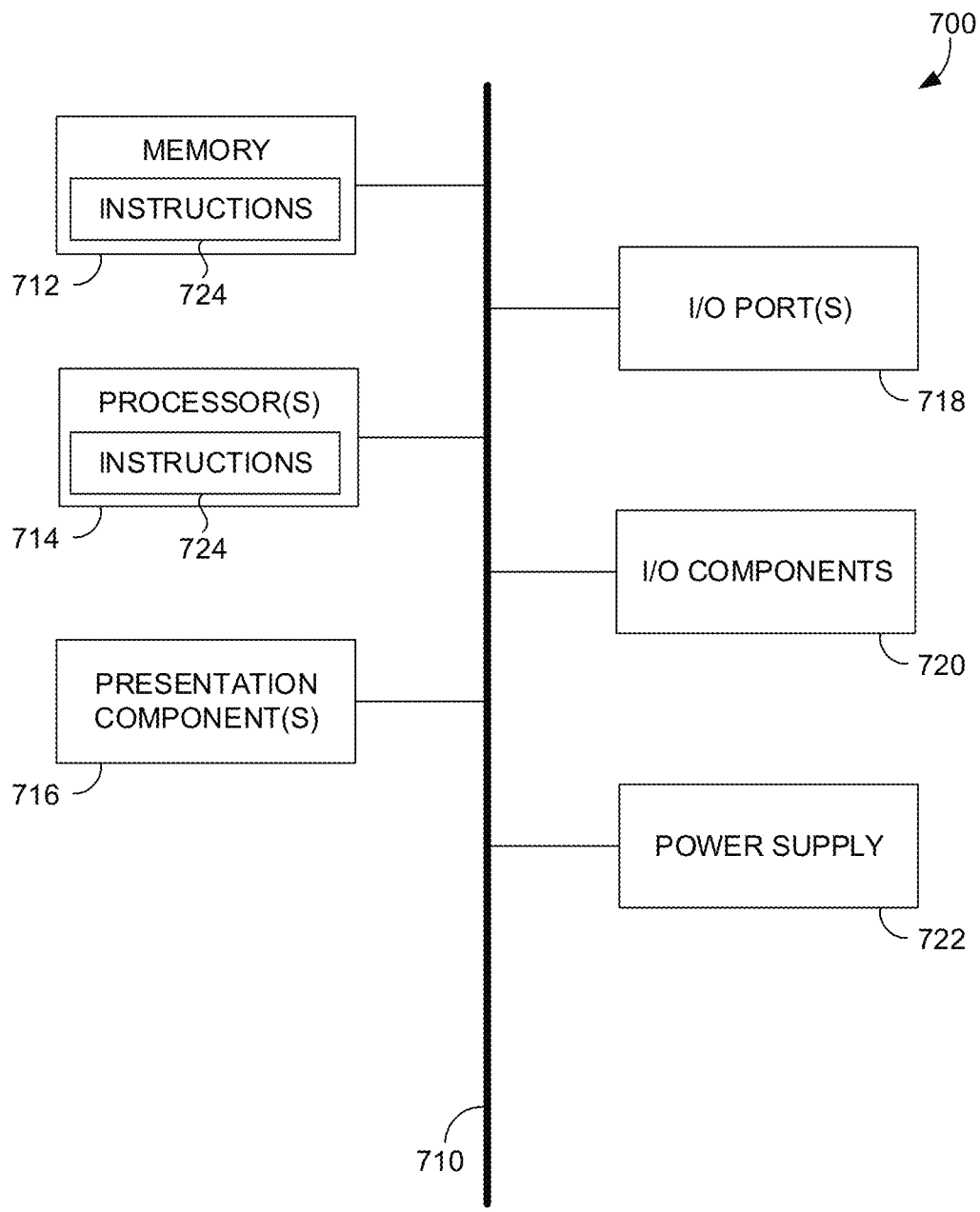
FIG. 7 is a block diagram of an example computing environment suitable for use in implementing embodiments of the present invention.

Having described an overview of embodiments of the present invention, an example operating environment in which embodiments of the present invention may be implemented is described below in order to provide a general context for various aspects of the present invention. Referring now to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Example hardware devices include solid-state memory, hard drives, optical-disc drives, etc. Computing device 700 includes one or more processors that read data from various entities such as memory 712 or I/O components 720. Presentation component(s) 716 present data indications to a user or other device. Example presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 700. Computing device 700 may be equipped with depth cameras, such as stereoscopic camera systems, infrared camera systems, RGB camera systems, touchscreen technology, and combinations of these, for gesture detection and recognition. Additionally, the computing device 700 may be equipped with accelerometers or gyroscopes that enable detection of motion. The output of the accelerometers or gyroscopes may be provided to the display of computing device 700 to render immersive augmented reality or virtual reality.

Embodiments described herein support image segmentation. The components described herein refer to integrated components of an image segmentation system. The integrated components refer to the hardware architecture and software framework that support functionality using the image segmentation system. The hardware architecture refers to physical components and interrelationships thereof and the software framework refers to software providing functionality that can be implemented with hardware embodied on a device.

The end-to-end software-based image segmentation system can operate within the image segmentation system components to operate computer hardware to provide image segmentation system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the image segmentation system components can manage resources and provide services for the image segmentation system functionality. Any other variations and combinations thereof are contemplated with embodiments of the present invention.

Although some implementations are described with respect to neural networks, generally embodiments may be implemented using any type of machine learning model(s), such as those using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
    extracting, using a shared encoder, query features from a query image and support features from a support image;
    generating, based on the support features and a support mask identifying pixels of the support image in a support class, a probe representing features of the support image; and
    jointly predicting, based on the probe, the query features, and the support features, a query mask and a support mask representing pixels in the support class.

2. The one or more computer storage media of claim 1, wherein generating the probe comprises generating a foreground probe representing foreground features of the support image and a background probe representing background features of the support image.

3. The one or more computer storage media of claim 1, the operations further comprising downsampling the support mask to generate a downsampled support mask, wherein generating the probe comprises performing masked average pooling of the support features using the downsampled support mask.

4. The one or more computer storage media of claim 1, wherein jointly predicting the query mask and the support mask comprises:
    using a shared fusion network to fuse the features of the support image with the query features to generate fused query features;
    using the shared fusion network to fuse the features of the support image with the support features to generate fused support features;
    using a shared decoder to decode the fused query features into the query mask; and
    using the shared decoder to decode the fused support features into the support mask.

5. The one or more computer storage media of claim 1, wherein jointly predicting the query mask and the support mask comprises predicting the query mask using a query branch of a similarity propagation network and predicting the support mask using a support branch of the similarity propagation network.

6. The one or more computer storage media of claim 1, the operations further comprising performing a batch edit on a collection of target images, based on an edit to the support image involving a region identified by the support mask, by predicting a corresponding region for each of the target images based on the probe and the support features.

7. The one or more computer storage media of claim 1, the operations further comprising generating a plurality of support probes, one for each of a plurality of support images, and averaging the support probes to generate the probe.

8. The one or more computer storage media of claim 1, wherein the operations are of a similarity propagation network trained using input channel averaging by converting ground truth query images to greyscale with a probability that decays as training progresses.

9. A computerized method comprising:
    generating, based on a support image and a support mask identifying pixels of a support class, a foreground probe representing foreground features of the support image and a background probe representing background features of the support image;
    probing extracted query features of a query image with the foreground probe and the background probe to generate a foreground attention map and a background attention map for the query image;
    fusing the foreground attention map, the background attention map, and the extracted query features to generate fused query features; and
    decoding the fused query features to predict a first representation of pixels of the query image in the support class.

10. The computerized method of claim 9, the method further comprising jointly predicting the first representation of the pixels of the query image in the support class and a second representation of pixels of the support image in the support class.

11. The computerized method of claim 9, the method further comprising downsampling the support mask to generate a downsampled support mask, wherein generating the foreground probe and the background probe is based on the downsampled support mask.

12. The computerized method of claim 9, the method further comprising downsampling the support mask to generate a downsampled support mask, wherein generating the foreground probe comprises performing masked average pooling of the foreground features of the support image using the downsampled support mask, and wherein generating the background probe comprises performing masked average pooling of the background features of the support image using the downsampled support mask.

13. The computerized method of claim 9, the method further comprising:
   using a shared fusion network to fuse the foreground features and the background features of the support image with the extracted query features to generate the fused query features;
   using the shared fusion network to fuse the foreground features and the background features of the support image with support features of the support image to generate fused support features;
   using a shared decoder to perform the decoding of the fused query features into the first representation of the pixels of the query image; and
   using the shared decoder to decode the fused support features into a second representation of pixels of the support image in the support class.

14. The computerized method of claim 9, the method further comprising performing a batch edit on a collection of target images, based on an edit to the support image involving a region identified by the support mask, by predicting a corresponding region for each of the target images based on the foreground probe, the background probe, and the support features.

15. The computerized method of claim 9, the method further comprising generating a foreground support probe and a background support probe for each of a plurality of support images, averaging the foreground support probe for each of the support images to generate the foreground support probe, and averaging the background support probe for each of the support images to generate the background support probe.

16. The computerized method of claim 9, wherein the method is performed by a similarity propagation network trained using input channel averaging by converting ground truth query images to greyscale with a probability that decays as training progresses.

17. A computer system comprising:
   one or more hardware processors and memory configured to provide computer program instructions to the one or more hardware processors;
   a feature extraction module configured to use the one or more hardware processors to extract query features from a query image and support features from a support image;
   an attentive fusion module configured to use the one or more hardware processors to fuse foreground information and background information from the support image with (i) the query features to generate fused query features, and (ii) the support features to generate fused support features; and
   a dual mask prediction module configured to use the one or more hardware processors to jointly predict, based on the fused query features and the fused support features, a query mask and a support mask representing pixels in the support class.

18. The computer system of claim 17, further comprising an edit propagation tool configured to use the one or more hardware processors perform a batch edit on a collection of target images, based on an edit to the support image involving a region identified by the support mask, by triggering a prediction of a corresponding region for each of the target images based on the foreground information and the background information from the support image.

19. The computer system of claim 17, wherein the attentive fusion module is configured to generate a foreground support probe and a background support probe for each of a plurality of support images, average the foreground support probe for each of the support images to generate the foreground information, and average the background support probe for each of the support images to generate the background information.

20. The computer system of claim 17, wherein the attentive fusion module and the dual mask prediction module are part of a similarity propagation network trained using input channel averaging by converting ground truth query images to greyscale with a probability that decays as training progresses.

* * * * *